(12) United States Patent
Pierson

(10) Patent No.: US 7,335,325 B1
(45) Date of Patent: Feb. 26, 2008

(54) FORMABLE STRUCTURE BETWEEN TWO OBJECTS

(76) Inventor: Mark Vincent Pierson, 65 Hospital Hill Rd., Binghamton, NY (US) 13901

( * ) Notice: Subject to any disclaimer, the term of this patent is extended or adjusted under 35 U.S.C. 154(b) by 307 days.

(21) Appl. No.: 10/636,874

(22) Filed: Aug. 8, 2003

Related U.S. Application Data

(60) Provisional application No. 60/402,934, filed on Aug. 14, 2002.

(51) Int. Cl.
*B29D 31/00* (2006.01)
(52) U.S. Cl. .......................... 264/223; 425/2
(58) Field of Classification Search .................. 425/2; 264/223, DIG. 30; 401/6; 473/551; 81/489; 16/430, DIG. 12
See application file for complete search history.

(56) References Cited

U.S. PATENT DOCUMENTS

| | | | | |
|---|---|---|---|---|
| 2,092,909 A | * | 9/1937 | Daniels | 36/154 |
| 3,985,853 A | * | 10/1976 | Weisberg | 264/250 |
| 4,385,024 A | * | 5/1983 | Tansill | 264/223 |
| 4,617,697 A | * | 10/1986 | David | 16/421 |
| 4,712,245 A | * | 12/1987 | Lyregaard | 381/324 |
| 4,785,495 A | * | 11/1988 | Dellis | 16/421 |
| 4,934,024 A | * | 6/1990 | Sexton, I | 16/421 |
| 5,000,599 A | * | 3/1991 | McCall et al. | 401/6 |
| 5,002,047 A | * | 3/1991 | Sandvig et al. | 602/8 |
| 5,006,055 A | * | 4/1991 | Lebisch et al. | 425/2 |
| 5,095,570 A | * | 3/1992 | Bar et al. | 12/142 N |
| 5,353,474 A | * | 10/1994 | Good et al. | 16/421 |
| 5,555,584 A | * | 9/1996 | Moore et al. | 12/142 N |
| 5,888,231 A | * | 3/1999 | Sandvig et al. | 623/36 |
| 2001/0022459 A1 | * | 9/2001 | Matsushima | 297/284.4 |
| 2003/0024543 A1 | * | 2/2003 | Wolf | 132/212 |
| 2003/0123917 A1 | * | 7/2003 | Willat et al. | 401/6 |

* cited by examiner

*Primary Examiner*—Robert B. Davis

(57) ABSTRACT

The present invention to be personalized is fitted with a sealed chamber. The chamber is defined by an object and a thin, flexible member. When it is desired to personalize the object, the sealed chamber is filled with uncured paste having predetermined characteristics. The object to be personalized then is brought into contact with a human; thereafter, the paste cures in place to complete the personalizing process.

10 Claims, 3 Drawing Sheets

FORMABLE STRUCTURE BETWEEN TWO OBJECTS

RELATED APPLICATION

This patent application is related to Provisional patent Application No. 60/402,934, filed Aug. 14, 2002, and claims priority therefrom.

FIELD OF THE INVENTION

The present invention relates to a structure and technique for developing a formable region between two physical objects and more particularly, a technique and structure for personalizing a region that contacts an individual.

BACKGROUND OF THE INVENTION

It is a widely recognized fact that no two individuals have identical shapes. Some people are tall, some are small. Some people are overweight, some are thin. Besides being right or left handed, we hold tools, writing instruments and sports equipment differently. Even our fingers are not shaped exactly as another person with the same weight. Our ears, noses, feet, mouth, face and knees for example, are constantly being formed into an unnatural shape by designed products made to fit to an average human. Therefore, the structure and technique of the present invention is useful adapting a personal feature to an object.

According to the following inventions,

U.S. Pat. No. 4,186,924 to Southey dated Feb. 5, 1980 describes a molded golf club grip with three different radian widths along its longitudinal axis to facilitate the hand of a user.

U.S. Pat. No. 4,911,569 to Hashimotto et al. dated Mar. 27, 1990, describes a writing instrument formed of a fluid enclosed body that is axially displaced by a writer's fingers that is restored to its original shape when released.

U.S. Pat. No. 5,095,570 to Bar et al. dated Mar. 17, 1992, describes making an insole for a foot by enclosing an uncured expandable resin along with a container of a curing agent with at least one hole in the container to activate the resin and to allow the resin, when hardened, to preserve the contour of the bottom of the foot.

U.S. Pat. No. 5,155,868 to Dellis dated Oct. 20, 1992, describes a moldable hand grip formed of an inner thermoplastic layer and an outer layer which, by heating both to a temperature of boiling water and cooling quickly; grasping before cooling will cause the thermoplastic inner layer to retain the hand shape.

U.S. Pat. No. 6,397,847 to Scarberry et al. describes a seal and face mask formable to a user's facial features but is non functional with shear forces of any kind and it can be reformed back to its original shape with heat.

While the structural arrangements and the steps described to achieve these prior arrangements, at first appearance, have similarities with the present invention, they differ in material respects. These differences, which will be described in more detail presently, are important for the effective use of the invention to achieve its advantages.

Several attempts have made to adapt an average human to relatively hard objects. Car steering wheels are formed on the backside for the average person's fingers. Bicycle hand grips are formed much the same way. A computer mouse is shaped for the average person, yet it fits no one perfectly. Most keys on keyboards have concave top surfaces in an attempt to fit the ends of most fingers, so they don't slip to another key when typing.

The softness of an object is another way to attempt to adapt a person to an object. The range has varied from hard rubber to soft silicone gel where the fingers contact a writing instrument, for example. Earphones are generally made out of soft material or forms to approximately fit a person's ear canal to the sound making structure. Soft, pliable foam materials are found in pens, bicycle grips and on some golf club grips. The shortcoming is they do not adapt a person's features to an object. The features are simply temporarily displacing or compressing those materials. There is little or no lateral support, other than friction, to prevent the object from slipping out of your fingers. The goal is to perfectly fit a person's features to drastically reduce stress or fatigue.

The present invention is adaptable for use in connection with several different objects such as power tools, weapons, writing instruments, foot inserts, ballerina slippers, hearing aids, lifting weight grips and bicycle grips. Other objects with a handle include, for example, a hammer, baseball bat, or a golf club. Any of these things can be personalized for any particular individual by using the structure and technique of the invention.

It is an object of the invention to provide a structure and technique for adapting any physical object to any other physical object.

It is another object of the invention to provide a structure and technique for personalizing office articles, sports equipment, tools and medical devices.

SUMMARY OF THE INVENTION

In accordance with the present invention, there is provided a structure and technique for developing a formable region between two physical objects and, more particularly, a technique and structure for personalizing a region that perfectly fits an individual to an object.

Briefly, the physical object to be personalized has a forming area that is filled with uncured paste material having predetermined characteristics. The forming area is defined by a flexible member. When it is desired to personalize the object, it is brought into contact with a living entity; thereafter, the paste cures in place to complete the personalizing process. The above and other objects, features and advantages of the present invention will become more readily apparent as a detailed description of the presently preferred embodiment proceeds.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Figure 1:
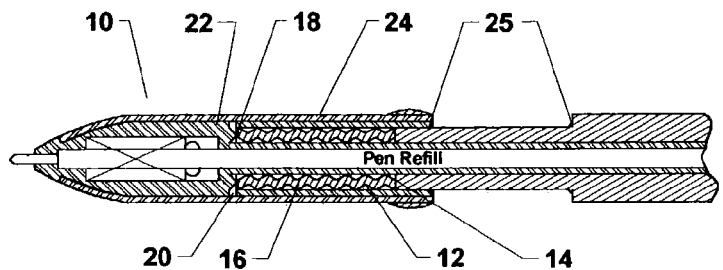
FIG. 1 is a cross sectional view of a pen with a personalizing area defined in accordance with the present invention.

Referring to FIG. 1 of the drawings, a physical object 10, or in this drawing a writing instrument, is used for the purpose of describing the features of the invention. It should be understood that many other objects could be the subject of this invention which include but are not limited to writing instruments, sports handles, tools and foot inserts.

The characteristics of silicone paste 16, in accordance with the present invention, includes an uncured thixotropic viscosity ranging from 50,000 to 250,000 centipose that (1) permits uncured material flow when forced to do so, (2) is not brittle after it is cured or set, which may range from 0–100 on the Shore A hardness scale, (3) is preferred to be a single substance not requiring mixing materials, (4) cures readily at room temperature after it is in place and formed, (5) will withstand compressive and shear forces, (6) will adhere to all materials it is in contact with, and (7) will not chemically degrade or cause any corrosive actions on any materials it is in contact with. A silicone based paste 16 made by General Electric, item #TSE392, has been found to be entirely satisfactory to function as the paste 16 called for by the invention. Even though a one part paste 16 is preferred because of ease of use, two and three part pastes such as silicone, urethane and epoxy formulations, could be mixed inside the cure space 22 of the physical object 10 prior to personalization.

Also, it must be noted that as the severity of application is increased with physical objects such as tools and sports equipment, the material strength must increase and the softness may decrease. One part, air curing, non sticky, putty like materials could be used as the forming paste 16, which may be acceptable for severe tool or sports applications. For example, uncured pastes with a viscosity ranging from 250,000 to 100,000,000 centipose could be used with or without a membrane 24 to separate one object, such as a finger, from another object, such as a hammer. The hardness of the resulting cured, personalized object may be up to 90 on the Shore D hardness scale.

In the case of one part silicone pastes, it is crucial that the silicone material be repackaged in a dry environment to keep the silicone chemical curing action from initializing. The storage package 12 is made from either bonded and sealed 0.0005" to 0.010" thick coated aluminum foil or 0.0005" to 0.010" thick high density polyethylene packaged inside an aluminum foil container with a desiccant. Both will allow a user to manipulate and keep the paste 16 cure-proof for approximately one year while stored in either container. Other thick walled containers can also be used to keep the storage packages from curing for up to one year before use. Several of the following embodiments require such packaging because a thin or open celled membrane 24 will allow the paste 16 to cure.

FIG. 1 shows the storage package 12, which contains the uncured silicone paste 16, disposed within the physical object 10. The physical object 10 comprises a piston 14, a threaded lock 25, piercing points 18, a passage way 20, a membrane 24 and a cure space 22.

Figure 2:
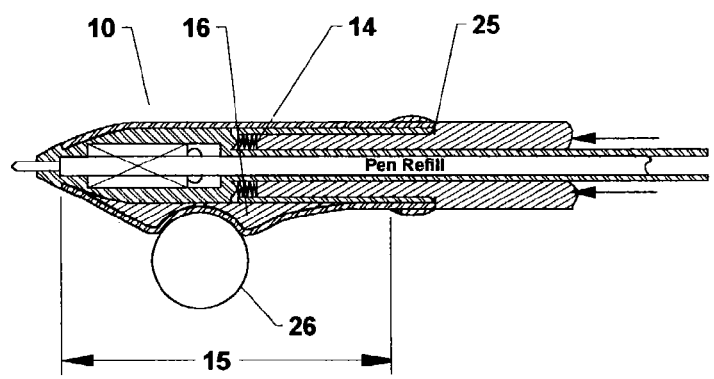
FIG. 2 is a cross sectional view of a pen for use in describing the present invention.

FIG. 2 consists of a physical object 10 comprising a threaded lock 25, a piston 14, silicone paste 16 and the form 26.

Figure 3:
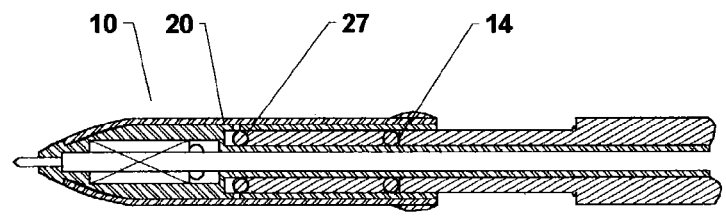
FIG. 3 is a cross sectional view of a pen that is in accordance with the invention.

FIG. 3 consists of physical object 10 comprising piston 14, paste 16, a valve seal 27, and a passage way 20.

Figure 4:
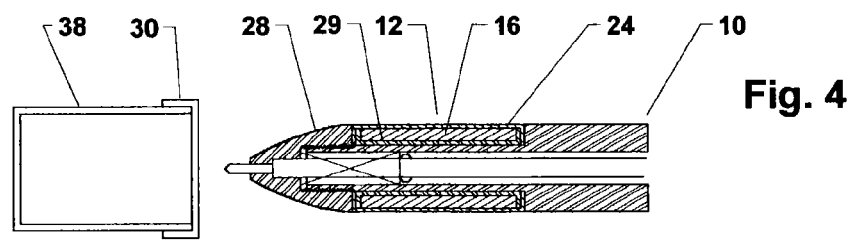
FIG. 4 is a cross sectional view of a paste package built into the writing instrument.

FIG. 4 consists of a physical object 10 with removable storage package 12 that is kept inside a sealed container 38 prior to personalization. The storage package 12 comprises a stiffener, paste 16 and membrane 24 that is held in place on the physical object 10 by a threaded pen tip 28.

Figure 5:
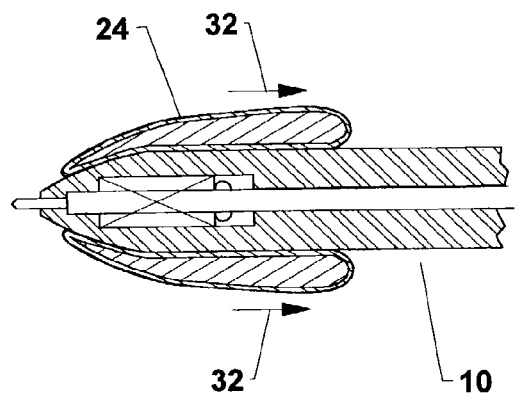
FIG. 5 is a cross sectional view of an external form adapted to a writing instrument.

FIG. 5 consists of physical object 10 comprising flexible, hollow, membrane 24.

Figure 6:
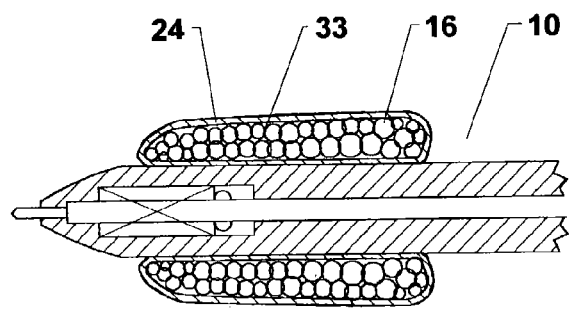
FIG. 6 is a cross sectional view of a different way to achieve the technique of the present invention.

FIG. 6 consists of physical object 10 comprising open celled foam coated internally with paste 16 and covered by membrane 24.

Figure 7:
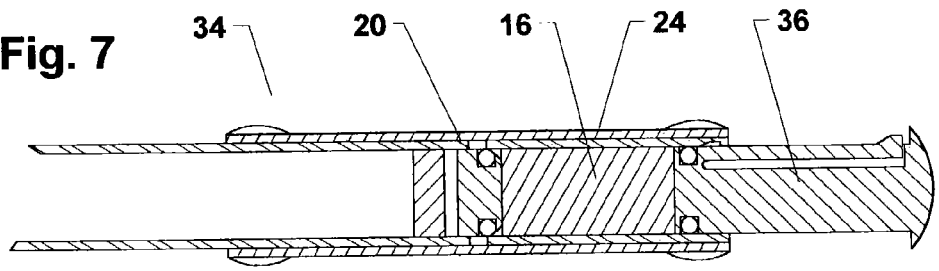
FIG. 7 is a cross sectional view of an article to which the technique of the present invention is applicable.

FIG. 7 consists of handle 34 comprising a dispenser 36, paste 16, cure space 22, and membrane 24.

Figure 8:
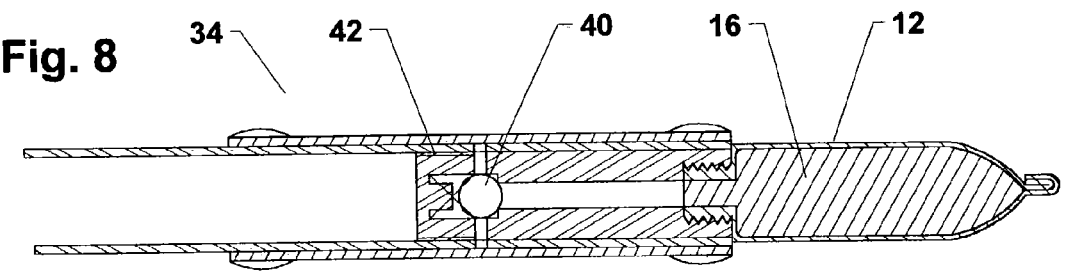
FIG. 8 is a cross sectional view of an article to which the technique of the invention is applicable.

FIG. 8 consists of handle 34 comprising storage package 12, paste 16, check valve 40 and an air vent 42.

Figure 9:
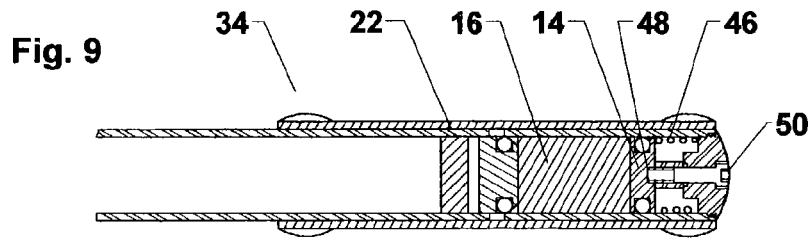
FIG. 9 is a cross sectional view of an aid in describing how the technique of the invention is applicable in still another arrangement adapted to perform according to the invention.

FIG. 9 consists of handle 34 comprising screw 50, spring 46, latch 48, piston 14, paste 16 and cure space 22.

Figure 10:
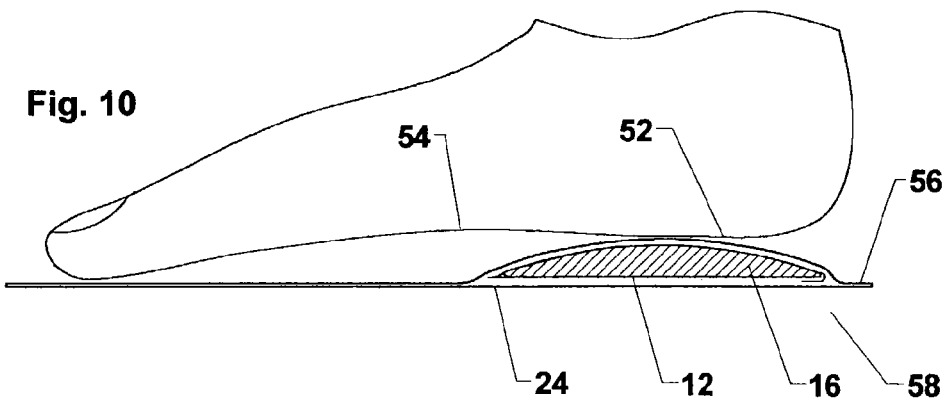
FIG. 10 is a cross sectional view of a personalized foot insert that describes the present invention.

FIG. 10 consists of a foot insert 58 that comprises storage package 12, paste 16, membrane 24 and bond 56

Figure 11:
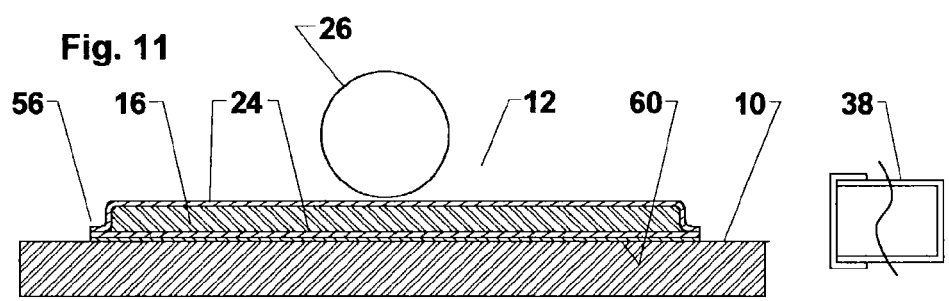
FIG. 11 is a cross sectional view of a personalized tape as described in the present invention.

FIG. 11 consists of physical object 10 that comprises storage package 12, paste 16, membrane 24, adhesive 60, form 26, bond 56 and sealed container 38.

Figure 12:
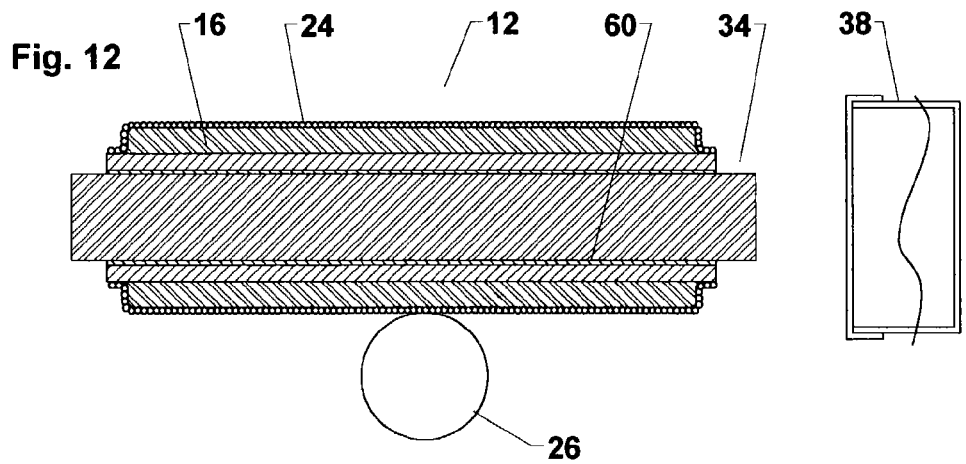
FIG. 12 is a cross sectional view of a personalized golf club grip as described in the present invention.

FIG. 12 consists of handle 34 that comprises storage package 12, paste 16, membrane 24, adhesive 60 and form 26.

As pointed out previously herein, the technique of the invention can be adapted readily for use with any item or object that comes in contact with an individual when used.

As shown in FIG. 1, when the physical object 10 is to be personalized to an individual, the piston 14 is pushed left (as viewed in the figure) to force the storage package 12 against piercing points 18, creating holes in the storage package 12, forcing the paste 16 out of the storage package 12 and through the passage way 20 into a cure space 22 under a soft, tough, flexible membrane 24. The membrane 24 may be made from a variety of materials such as polyurethane, latex, neoprene, silicone, open or closed cell polyurethane foam, for example. The membrane 24 material may be replaced by molding the paste 16 to the desired shape and partially curing it to create a "thin skin" of cured paste 16 on the outside to mimic the preferred membrane 24.

In FIG. 2, the piston 14 is shown fully left, after the above described steps are completed. A threaded lock 25 will secure both halves of the pen (physical object) together with a clockwise twist of one part to the other. Threads are preferred type of fastening. After the physical object 10 is locked together, the form 26 will personalize the uncured paste 16 to a perfect fit between both the physical object 10 and the form 26. The forming area 15 must not be touched until the paste 16 is cured to eliminate other features from being formed within the forming area 15. The physical object 10 may be placed in a vertical position so the paste 16 can be fully cured without touching any other object.

In FIG. 3 of the drawings, an arrangement without a separate sealed paste 16 storage package 12 is illustrated. The silicone paste 16, however, is stored and sealed within the writing instrument or physical object 10. When the piston 14 is moved towards the left, the O ring valve seal 27 moves left and exposes holes in the passage way 20. The paste 16 moves into the cure space 22 as described above for completing the personalizing process.

FIG. 4 depicts another type of storage package 12 that can be easily attached to the physical object 10. The storage package 12, consisting of a stiffener, paste 16 and membrane 24 slides on or off the physical object 10. Since the thin membrane 24 could expose the paste 16 to humidity and start the curing action, before it is desired to do so, it must be transferred and kept under low humidity conditions then stored in a sealed container 38 that is cure-proof. The storage package 12 will have a sealed cap 30, if it is a rigid container. Metallic foil packages that can be easily opened by ripping could also be used to store the storage package 12. The pen tip 28 is threaded and as such, securely fastens the storage package 12 to the physical object 10. If the final personalized impression is not correct, the cured package can be easily removed and replaced by an uncured package and reformed when it is in position.

FIG. 5 depicts another way to personalize a physical object 10. Here, flexible, hollow, sealed membrane 24 is filled with silicone paste 16. Such a sealed membrane 24 is pushed and rolled onto a physical object 10 as shown by the placement direction 32 arrows. As in FIG. 4, this must also be stored in a cure-proof sealed container 38 before use.

FIG. 6 illustrates a personalization alternative by using an open cell foam. After first thinly coating the cells with silicone paste 16, the entire outside of the open celled filled foam 33 would have a membrane 24 to avoid any external stickiness. The form 26 compresses the open cells together and the thinly coated paste 16 keeps all the cells compressed together where contact occurs, forming a perfect fit. The package is vented to allow air to escape as it is formed.

FIG. 7 illustrates a personalized handle 34 that is representative of other, different types of handles such as, for example, a baseball bat, a golf club, bicycle grip, ski poles, etc. that are held in one position by a user. By moving the dispenser 36 left, the paste 16 is passed into the cure space 22 between the handle 34 and the membrane 24.

FIG. 8 is an arrangement illustrating the paste 16 material being retained in a separate cure-proof storage package 12, with a check valve 40 to ensure one-way flow of the paste 16 material. An air vent 42, permits entrapped air to escape as the paste 16 is moved into the cure space 22 to eliminate air in the paste 16.

In FIG. 9 of the drawings, the arrangement of the invention shows the paste 16 stored inside the handle 34. By turning a screw 50, a latch 48 releases a spring 46 to force the piston 14 and the paste 16 material into the cure space 22 for personalization.

FIG. 10 is a cross section view of a foot insert 58 that is to be personalized by using the technique of the invention. The silicone paste 16 material is enclosed within a storage package 12, and is placed accordingly. The membranes 24 have a bond 56 between each other on the periphery of the foot shaped membrane 24. Weight applied by the person's heel 52 will burst the storage package 12 to release the paste 16 to fill the space between the membranes 24 and produce a perfect fit between the foot bottom 54 and the top inside of the footwear. The paste 16 material is preferably of a silicone extraction, according to the present invention, since that material is both soft and flexible when cured.

FIG. 11 is a cross section of a storage package 12. The storage package 12, including paste 16, would be stored in a sealed container 38 to prevent premature curing. The membrane 24 has a bond 56 all around the periphery of the membranes 24. The paste 16 is stored between the membranes 24. A pressure sensitive adhesive 60 is exposed on the entire surface thereof. The storage package 12 would be placed on a physical object 10 and pressure would be applied evenly over the entire storage package 12 to adhere it properly to the physical object 10. The form 26 would then personalize the storage package 12 which would then be left untouched as it is cured. This storage package 12 could also be a long, narrow tape, depending on the application.

In FIG. 12 the storage package 12 could be a hollow, cylindrical shape with water soluble adhesive 60 inside of the storage package 12. Storage package 12 could be slid laterally into position, on the handle 34, such as in a golf club, not shown. The outer membrane 24 may be made from open or closed cell polyurethane foam, which would be flexible as needed, and have a high coefficient of friction for a secure grip of the golf club. The inner membrane 24 may be thicker or stiffer for ease of sliding the grip laterally into position. The form 26 would then personalize the storage package 12 as mentioned herein.

Therefore, an important feature of the invention is the particular paste 16 material in its final formulation that is personalized by touch and then is allowed to cure.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A formable structure between two objects for exactly fitting a first physical object to another physical object comprising:
   a burstable storage package, for containing said humidity-curable paste;
   a membrane, for separating said humidity-curable paste from an object feature;
   a cure space, for holding said humidity-curable paste during personalization and curing; and
   said humidity-curable paste comprising compression and shear resistant properties, for adapting to contours of said object feature, cured in said cure space and inside said membrane.

2. The formable structure between two objects as recited in claim 1, wherein said humidity-curable paste is curable at room temperature.

3. The formable structure between two objects as recited in claim 1, further comprising:
   a piston, for pushing said humidity-curable paste from said storage package into said cure space.

4. The formable structure between two objects as recited in claim 1, further comprising:
   a dispenser, for dispensing said humidity-curable paste from said storage package into said cure space.

5. The formable structure between two objects as recited in claim 1, further comprising:

a sealed container, for storing and keeping said humidity-curable paste from premature curing.

6. The formable structure between two objects as recited in claim 1, where said storage package has characteristics selected from the following group: cure-proof, having a membrane, and having a mounting surface.

7. The formable structure between two objects as recited in claim 1, wherein said membrane has characteristics selected from the following group: flexible, isolating, thin, tough, and foam.

8. The formable structure between two objects as recited in claim 1, wherein said paste storage package, said humidity-curable paste, said membrane and said cure space are removable from said first physical object to reform said structure between said first object and said another physical object.

9. A formable structure between two objects for exactly fitting any physical object to another physical object comprising:

a cure-proof storage package, having a membrane and a mounting surface, for containing paste;

a piston, for pushing said paste from said storage package into said cure space;

a flexible, isolating, thin, tough, foam membrane, for separating said paste from an object feature;

a cure space, for holding said paste during personalization and curing;

a dispenser, for dispensing said paste from said storage package into said cure space;

a sealed container, having an opening and a cap, for storing an keeping said paste from premature curing; and said paste being thixotropic when uncured, soft when cured, and having compression and shear resistant properties, for adapting to contours of said object feature, cured to said cure space, and to said membrane.

10. A method for fitting a first physical object to a second physical object having contours, the steps comprising:

transferring uncured humidity-curable paste from paste storage in a burstable storage package to a cure space;

adapting contours of said first physical object to said cure space; and curing said humidity-curable paste.

* * * * *